May 9, 1961 F. HENNIG 2,983,789

ARRANGEMENT FOR SUPPRESSING DISTURBANCE IN TELEGRAPHIC COMMUNICATIONS

Filed April 15, 1957 5 Sheets-Sheet 1

Inventor:
Fritz Hennig.
By [signature] Atty

Inventor:
Fritz Hennig
By [signature] Atty.

May 9, 1961
F. HENNIG
ARRANGEMENT FOR SUPPRESSING DISTURBANCE
IN TELEGRAPHIC COMMUNICATIONS
2,983,789
Filed April 15, 1957
5 Sheets-Sheet 3

Inventor
Fritz Hennig.
By. [signature] Atty.

Inventor
Fritz Hennig
By [signature] Atty.

Inventor:
Fritz Hennig
By [signature] Atty.

United States Patent Office 2,983,789

Patented May 9, 1961

2,983,789

ARRANGEMENT FOR SUPPRESSING DISTURBANCE IN TELEGRAPHIC COMMUNICATIONS

Fritz Hennig, Munich-Solln, Germany, assignor to Siemens & Halske Aktiengesellschaft Berlin and Munich, a corporation of Germany Filed Apr. 15, 1957, Ser. No. 652,868

Claims priority, application Germany Apr. 24, 1956

9 Claims. (Cl. 178—23)

The present invention relates to a system for detecting and correcting errors in telegraphic communications.

As is known, telegraph symbols, particularly in the case of wireless transmission, are falsified both by disturbances which extinguish a signal element of the telegraph symbol as well as by disturbances which produce a signal element which in itself is not present in the telegraph symbol. These disturbances have different effects in the individual transmission systems.

In the so-called single-current methods, the spacing and marking signal elements of the telegraph symbols are respectively indicated by transmitting a signal only for the signal elements of one polarity while no signal is transmitted in the case of signal elements of the other polarity. In this system, the disturbances have the effect that a spacing signal element is made to appear to be a marking signal element or vice versa. Such a disturbance cannot be directly noted on individual signal elements, but it is possible to secure individual teleprinter symbols composed of a plurality of elements against errors. For this purpose there are used well-known coding and repeating systems.

In the so-called double-current systems, both the spacing and the marking signal elements are indicated by specific signals. Thus for instance in the well-known double-tone or frequency keying system, a given frequency $f1$ is allotted to or associated with each spacing signal element while a definite frequency $f2$ which differs from the frequency $f1$ is allotted to or associated with each marking signal element. In case of disturbance-free transmission, only one of the two frequencies can occur at any time at the place of reception. However, if the transmission is disturbed, other conditions are possible; either both frequencies appear simultaneously or else, neither of the two frequencies is present. In these cases the receiving member is not affected in either one or the other sense. If for instance the receiving member is a polarized relay, such relay remains deenergized, its armature accordingly remaining at the side at which it happens to be. In 50% of all cases of disturbance of the type indicated, this results in the falsifying of the signal element in question.

As mentioned before, if the disturbance affects only one of the two frequency ranges, either both frequencies occur simultaneously or both are absent. These disturbances can therefore be recognized already at the individual signal elements. The expression "disturbance of a lower degree" is used below for such disturbance.

It the disturbance affects at the same time both frequency ranges, then either a spacing signal element is made to appear to be a marking signal element, that is, the frequency $f2$ is produced from the frequency $f1$, or the opposite occurs in which case a marking signal element is made to appear to be a spacing signal element, that is, the frequency $f1$ is produced from the frequency $f2$. Disturbances of this type cannot be recognized from the individual signal elements and in all cases lead to an improper setting of the receiving member. For this type of disturbance there is employed below the expression "disturbance of higher degree." Such disturbances of higher degree can be recognized and possibly eliminated only by coding or repeating operations.

In the single-current system, all disturbances act as disturbances of higher degree since they are not recognizable at the individual signal element. However in double-current systems there occur disturbances of higher degree and also disturbances of lower degree. The disturbances of higher degree are much rarer than those of lower degree.

Various error correcting methods are known or have been proposed. The so-called element testing method makes use of the fact that only one of the two frequencies $f1$ or $f2$ can be present in double-current transmission in the absence of disturbances. A condition in which both frequencies are present simultaneously or both are absent, will be detected with the element testing method, and the element in question or the corresponding telegraph symbol to which this signal element belongs will be identified as "disturbed." This method accordingly cannot detect disturbances of higher degree and will in such a case produce a falsified symbol. In the case of telegraph symbols transmitted by the single-current method, disturbances can accordingly not be detected at all by means of the element testing method.

There are also known the so-called repeating methods or systems in which either the individual signal element and repetition thereof or the entire combination of symbol elements forming a telegraph signal is used to detect disturbance. Thus, for instance, in a known repeating system, each telegraph symbol is transmitted several times in succession and, based upon statistical procedure, there is formed at the receiving end, from the various transmissions, a telegraph symbol which corresponds with very great probability to the symbol transmitted. Disturbances of low degree and also disturbances of high degree may be recognized in repeating systems, but there has not become known any repeating method adapted to detect with complete reliability both disturbances of low degree and disturbances of high degree. All known systems detect the disturbances only with a given degree of probability.

The known coding systems also detect disturbances of lower and higher degree but likewise only with a given degree of probability. In these systems, the telegraph symbols are converted into a disturbance-freeing code making it at the receiving side possible to recognize with a given degree of probability whether the signal received is or is not disturbed. These systems detect with the same degree of probability both the falsified elements caused by disturbances of lower degree and those caused by disturbances of higher degree, with the same degree. Of particular interest are in this connection systems which can identify even multiply disturbed signals as being disturbed. All prior error correcting systems have been developed taking into consideration specific transmission properties of the transmission path or in consideration of specific types of disturbance. It was in this way possible to create error correcting systems which, assuming specific transmission properties or types of disturbance, have a very good effect, but if the transmission properties or the type of disturbance change, they decrease in effectiveness. It is clear that these error correcting systems, developed for special conditions, cannot be employed universally with the same degree of success.

In order to increase the effectiveness of the individual error correction, some of these systems have already been used in combination. None of the combination systems which have become known up to the present time have however led to satisfactory results. This is due predominantly to the fact that the disturbances have been classified up to the present time into single and double disturbances. By single disturbances are understood disturbances which during transmission falsify only the signal elements of one polarity, for instance the marking signal elements. As double disturbances there are considered on the other hand disturbances which during a transmission falsify both the marking and the spacing signal elements. If a system which detects single disturbances is now combined with a method which is also effective with respect to double disturbances, an increased error elimination is indeed obtained, but such elimination or correction is due only to the additive effect of the two individual systems. The fact that these combination systems have not found acceptance in practice is believed to be largely due to the cost which is too high as compared with the results achieved, or else due to greatly reduced volume of message transmission.

There has already been proposed a system which utilizes for the error correction the fact that in a coding system in which multiple disturbances may definitely lead to a symbol which is within the coding system evaluated as a correct symbol but which can be recognized to be disturbed by means of an element testing method. In such system, therefore, by the simultaneous use of a code testing device and an element testing device, increased assurance against errors and false signals is obtained, and the disturbance indicating device, which for example produces an automatic call-back, is actuated based upon the findings of both testing devices. In the absence of the possibility of call-back, for example in case of one-way wireless communication, this disturbance indication may be utilized to print a smudge symbol. This does not always constitute sufficient assurance for practical operation.

There have furthermore been proposed systems which by means of a code testing device in the case of a nine-element code or a code having a higher number of elements automatically correct singly disturbed signals. In one of these systems each telegraph symbol is according to a given rule transmitted twice with similar or mirror-symmetrical polarity, permitting correction by comparison of the two symbols received and by means of a given criterion which has led to the selective transmission with identical or mirror-symmetrical polarization.

The object of the present invention is to provide, without reducing the volume of communication, improved disturbance correction as compared with previously known systems and to make it possible to correct even multiply disturbed signals down to a negligible portion thereof. The arrangement in accordance with the invention is accordingly particularly well suited for unidirectional wireless communication in which call-back is entirely out of question and in which it is therefore practically impossible to replace a disturbed symbol by the correct symbol.

The system in accordance with the invention, for error correction of telegraphic communications transmitted by a double-current method as element groups of an error-indicating code employs, just like a known system, a code testing device and also an element testing device. The system in accordance with the invention, however, in contradistinction to the known system, is characterized by the fact that a correction of signals recognized to be disturbed by the code-testing device is effected, depending upon the reception result of the element testing device. The result of the element testing is, however, not used for the printing of a smudge symbol or for an automatic call-back, but rather for the correction of a symbol recognized to be disturbed by the code testing device. In other words, if within a symbol which has been recognized to be disturbed by the code testing device individual elements have been recognized to be erroneous by the element testing device, then specifically these elements within the received symbol are reversed in polarity in accordance with certain rules. The correct signal can in this manner be ascertained as a rule.

Details of the invention will now be explained with reference to the accompanying drawings, wherein Fig. 1 shows means for receiving and storing received elements belonging respectively to the code testing device and to the element testing device of one embodiment;

Figure 3:
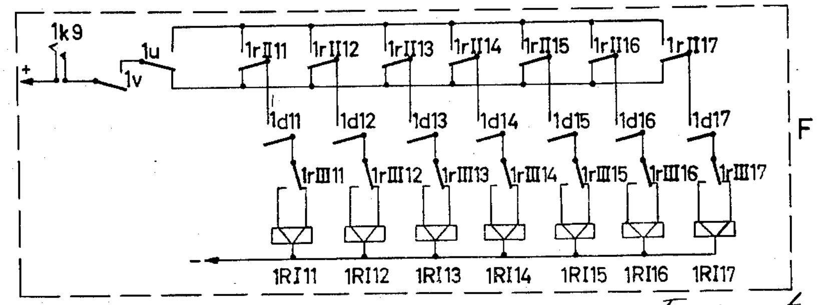
Fig. 3 shows a device for effecting reversal of polarity of elements of a teleprinter symbol which are received with uncertain accuracy, depending upon the findings of the code testing and the element testing device of Fig. 1.
Figure 4:
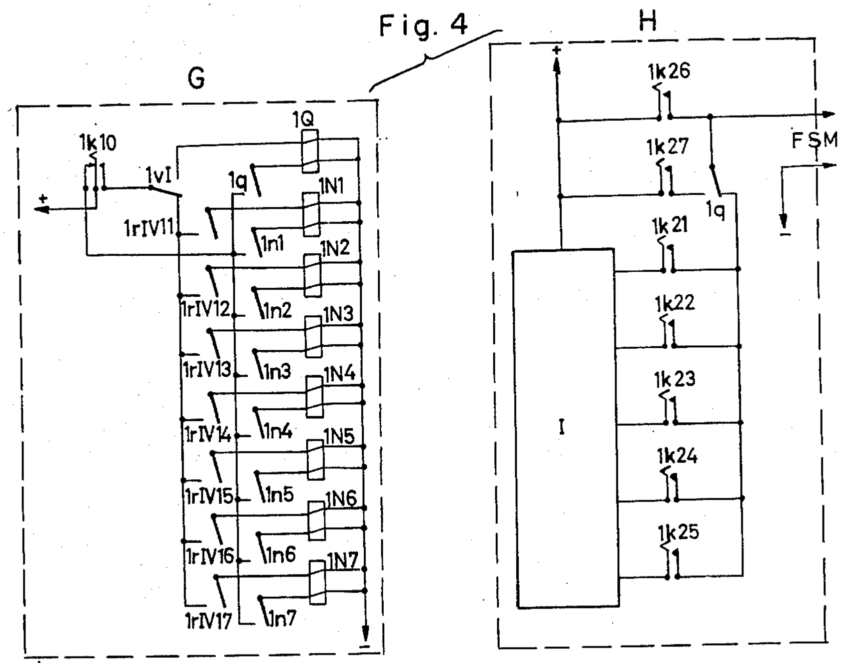
Fig. 4 shows details required for the code conversion and further transmission of telegraph signals in the embodiment according to Figs. 1 to 3.
Figure 5:
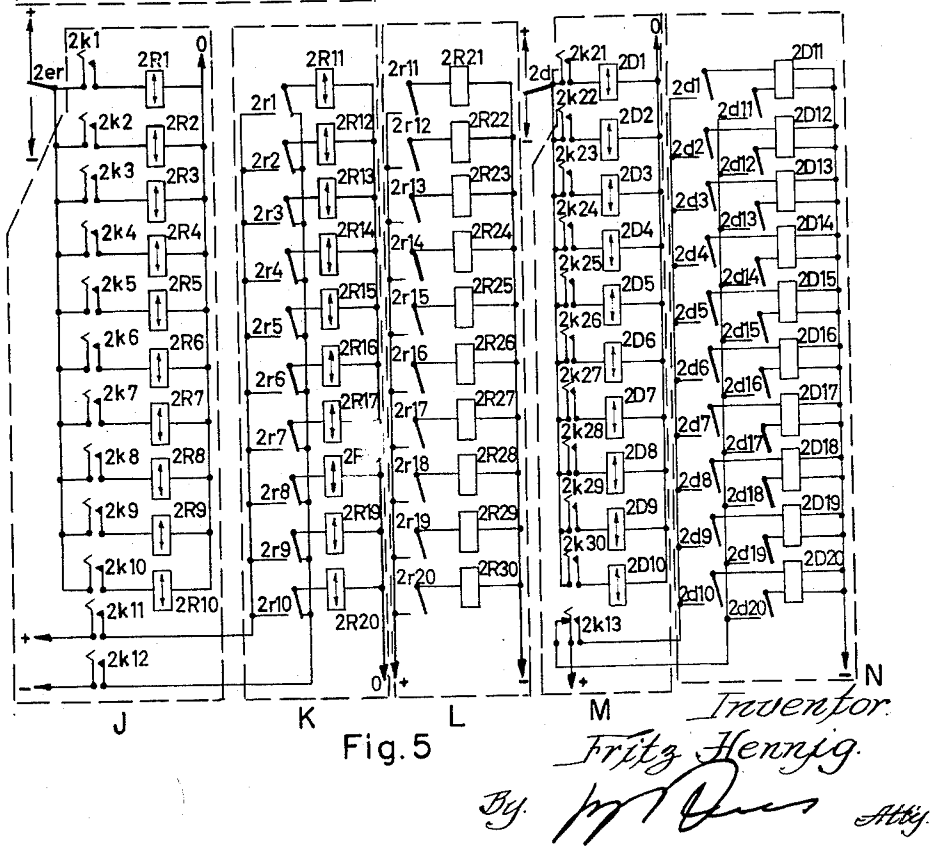
Figs. 5–7 show another embodiment of the invention.
Figure 6:
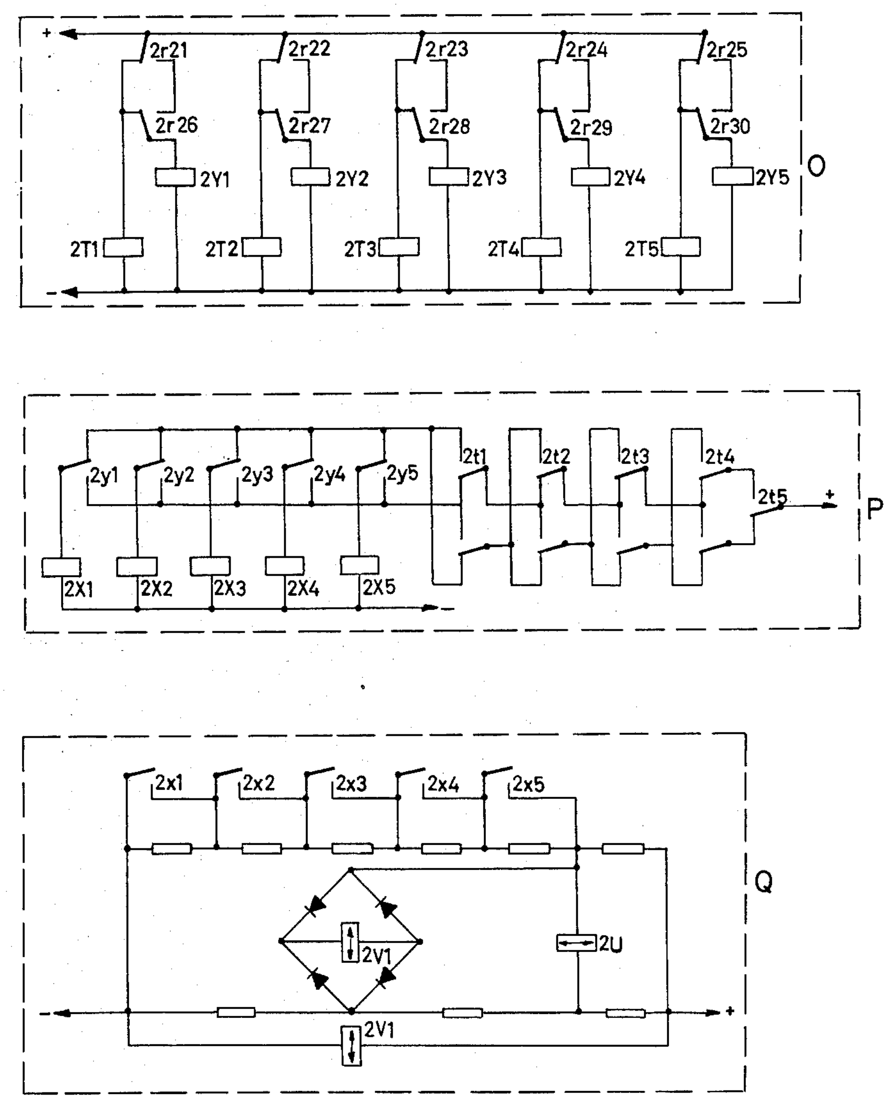
Figure 7:
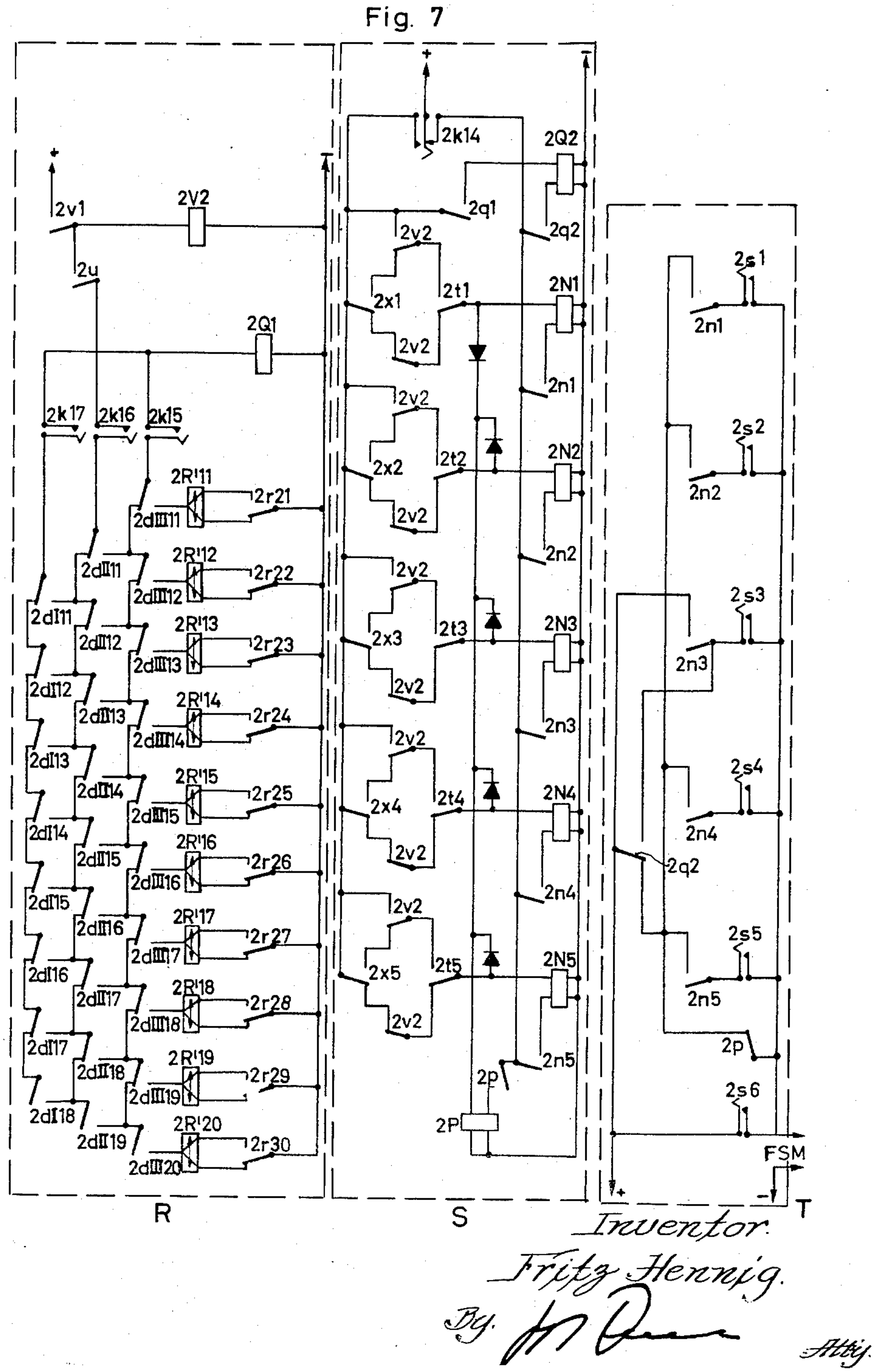
Figure 8:
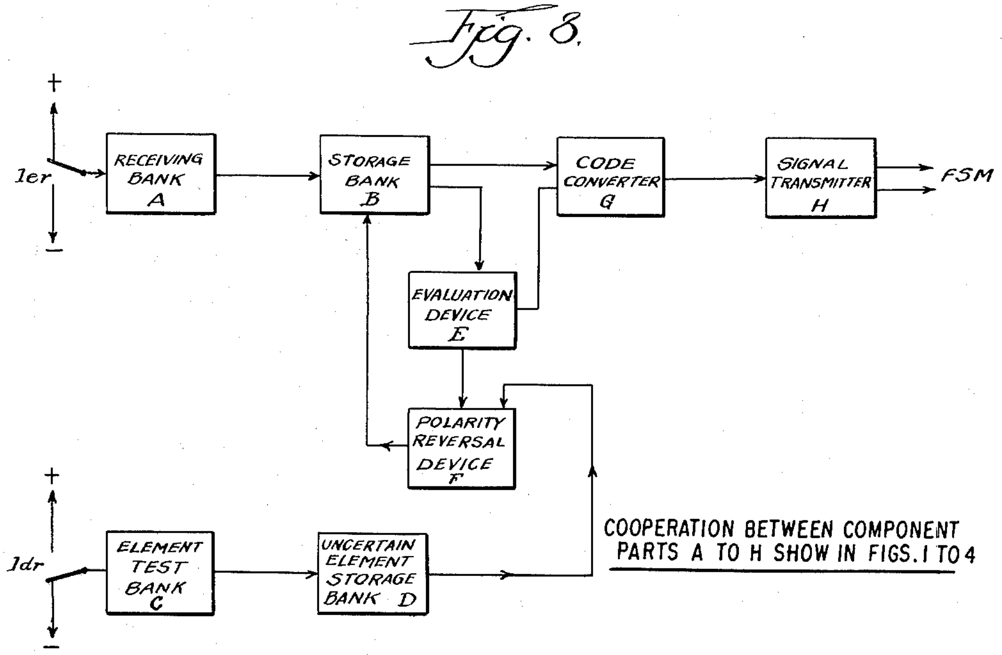
Figure 9:
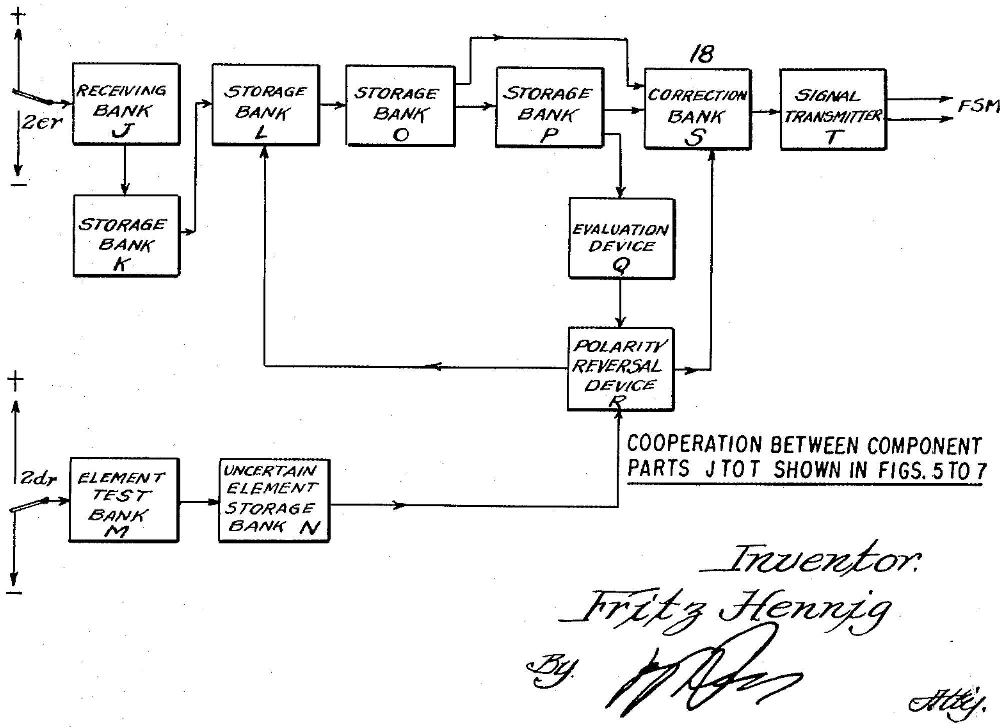

Fig. 8 shown, in block form, the cooperation between component parts shown in Figs. 1 to 4; and Fig. 9 shows, in block form, the cooperation between component parts shown in Figs. 5 to 7.

In the embodiment according to Figs. 1 to 4, it is assumed that messages are transmitted with the so-called seven-element code, such code being adapted for use as safety code since there are used for the message transmission only the signals which contain three spacing and four marking elements. A code testing device can therefore always recognize a signal to be disturbed if the ratio of spacing to marking signal elements is not 3 to 4. For this purpose upon reception of the telegraph signals, each signal is tested, by means of a separate evaluating device, as shown by way of explanation in Fig. 2, as to this ratio 3 to 4, and if a deviation from the proper ratio is noted, the corresponding telegraph signal is recognized to be disturbed.

Before taking up the details of the switching operation, it should be pointed out that upon the testing of a received symbol by the code testing device, two groups of disturbed symbols can be differentiated, namely:

(1) The symbol contains more than three spacing elements. In this case the number of received spacing elements which are of uncertain accuracy is counted. If this number agrees with the number of excess spacing elements, these spacing elements are reversed in polarity. Otherwise a signal is delivered indicating that an uncorrectible symbol is present. This can take place for instance by a smear signal or by a spacing signal. Since the corresponding operations require a greater expenditure from the standpoint of switching technique, the correction is modified by reversing the polarity of all spacing elements of uncertain accuracy. If the number of spacing elements is then still different from 3, the indicated smudge or blank (spacing) signal is given. The evaluation result is in both cases the same.

(2) The signal contains less than three spacing elements. The signal elements of uncertain accuracy are reversed in polarity in an analogous manner.

A signal element is of uncertain accuracy if a disturbance arises during the transmission of an element which does not completely prevent reception thereof but might cause erroneous evaluation of such single element. This uncertainty may be determined by means of integrating scanning.

Figure 1:
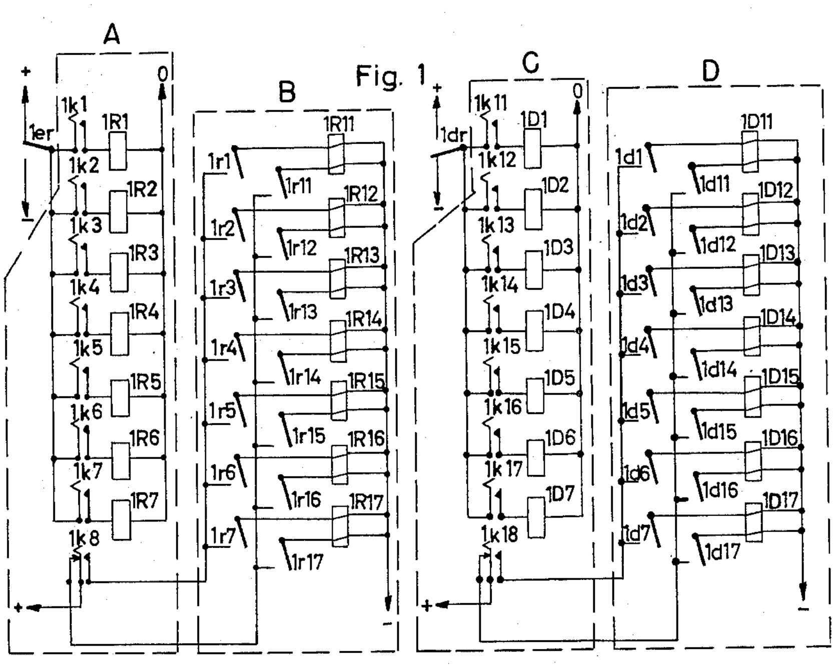

In Fig. 1 there are provided for the reception and storage first of all polarized receiving relays 1R1 to 1R7 which are successively connected by distributor contacts **1*k*1 to 1*k*7 with the armature 1*er* and are thus set corresponding to the signal elements received. In order to gain time for the evaluation and if required for the reversal of polarity, the setting of the relays 1R1 to 1R7 is thereupon, that is, after the receipt of the entire symbol, transferred, by briefly reversing distributor contact 1*k*8, to the neutral storage relays 1R11 to 1R17 which are after operative actuation over contacts 1*r*1 to 1*r*7** automatically held by their holding winding connected by contacts 1r11 to 1r17 of the respective storage relays.

Further storage relays 1D1 to 1D7 serving for the element testing are in similar manner actuated by way of distributor contacts 1k11 to 1k17, preparing over contacts 1d1 to 1d7 circuits for relays 1D11 to 1D17 which are energized responsive to operation of distributor contact 1k18 and thereupon held actuated for the duration of one symbol. One of the D-relays will always be caused to energize when the element which has just been received is to be characterized as of uncertain accuracy. This can take place for instance upon simultaneous receipt of the two possible frequencies below a minimum level even though with different intensity or if, during one signal element, the reception has temporarily or entirely stopped. For example, if relay 1D11 is energized, this means that the element stored in relay 1R11 is of uncertain accuracy.

Figure 2:
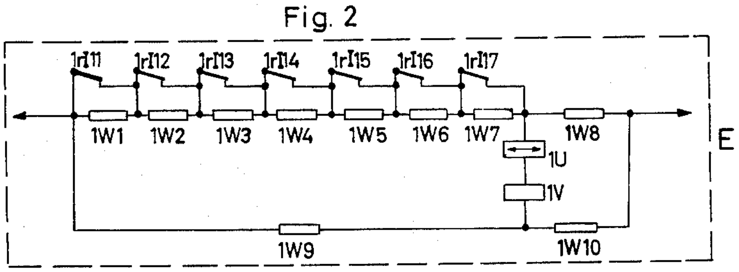
Fig. 2 shows an evaluating device cooperating with the code testing device according to Fig. 1.

Fig. 2 shows a bridge operating as an evaluating device, comprising resistors 1W1 to 1W10. This bridge serves to determine the number of spacing elements received within the received symbols. Upon the occurrence of three spacing elements in a symbol and therefore in the case of a symbol of the security code selected for the transmission of the intelligence, three of the relays 1R11 to 1R17 are energized and have connected three of the resistors 1W1 to 1W7 in the variable branch of the bridge. The bridge is in such case balanced and the non-polarized bridge relay 1V is deenergized. If the number of spacing elements is different from 3, the non-polarized relay 1V is energized and the polarized relay 1U simultaneously indicates whether too many spacing elements are present by placing its armature 1u, Fig. 3, in alternate position, whether the number of spacing elements is insufficient, by retaining its armature 1u in the illustrated position.

Fig. 3 shows the polarity-reversal device in which there are provided in addition to the contacts 1u and 1v controlled by relays 1U and 1V, contacts of the receiving relays 1R11 to 1R17 and of the element test relays 1D11 to 1D17. Furthermore, the polarity-reversal device contains the windings 3 and 4 of relays 1R11 to 1R17, these two windings being in each case designated by the same reference numeral as the corresponding relays in Fig. 1 with the addition of an I. After the setting of the storage relays 1R11 to 1R17 and also of the element test relays 1D11 to 1D17, voltage is briefly applied to the polarity-reversal device by way of the distributor contact 1k9 if the bridge relay 1V has detected a disturbed signal. Otherwise the received signal is transmitted without change and, if desired, printed.

In the case of the elements characterized as being of uncertain accuracy, the corresponding D-relay (Fig. 1) is energized. Only in connection with such uncertain elements can one of the polarity-reversing windings 3 or 4 of the storage relays 1R1 to 1R7 become operatively effective. Let us assume for instance that within the evaluating device shown in Fig. 2, it has been found that the received symbol has less than three spacing elements. The armature 1u (Fig. 3) is then in the illustrated position. As a result, all windings of the storage relays 1R11 to 1R17 which lie on the marking side receive a current impulse over the winding 4, this being the case when the contacts 1rII11 to 1rII17 are at normal while a contact such as 1d11 to Id17 of the corresponding D-relay is actuated, indicating an uncertain element. As a result of this current pulse the corresponding storage relay is energized and is held over its winding 2 (see also Fig. 1). The reverse occurs when the relay U has actuated its contact 1u into alternate position, indicating an excessive number of spacing elements. In such case, all the storage relays which lie on the spacing side and which have received an uncertain signal are released by an opposing current applied to winding 3 thereof.

The polarity-reversal windings and the contacts of the storage relays form in a sense an interrupter circuit. The closing time of the contact 1k9 must thereby be such that at all times only a single reversal of polarity can take place. It may be mentioned here, that the time conditions become even simpler when there are provided polarized storage relays and neutral sequence relays—as will be presently explained in connection with the second embodiment, Figs. 5 to 8.

If, as a result of the reversal of polarity of the uncertain elements the ratio between spacing and marking current elements is produced, which ratio should be 3 to 4, the bridge relay 1V deenergizes and, upon the following actuation of the distributor contact 1k10 (Fig. 4), the setting of the storage relays 1R11 and 1R17 is transmitted to the input relays 1N1 to 1N7 of the code converter I (Fig. 4). The same occurs when the relay 1V has not responded at all. If on the other hand after the reversal of polarity the number of spacing elements differs from 3, then upon the actuation of 1k10 the input relays of the code converter are released and the smudge signal relay 1Q is caused to energize.

The armatures of relays 1N1 to 1N7 effect in known manner the conversion of the signals from the seven-element code to the five-element code. Over the contacts 1k21 to 1k26, controlled by the distributor shaft, a normal telegraph signal is then transmitted to the teleprinter FSM. If on the other hand the smudge signal relay 1Q is energized, its armature 1q shifts during the stop element to a special transmitting contact 1k27 for the purpose of transmitting a smudge signal, for instance, the element group 32 or a spacing signal. The relay 1Q may also cause an automatic call-back provided that a call-back is possible at all in the corresponding connection.

It may be mentioned that upon reception in accordance with the invention, the number of smudge signals will be substantially less than in the case of a pure evaluating system. The number of errors, that is, the number of wrong signals printed will slightly increase. This increased number of errors results from the fact that correct elements are occasionally characterized as uncertain and reversed in polarity. As a result, a symbol may be produced in the case of disturbed elements, which fulfills the code condition but which is not identical with the symbol transmitted. This increased number of errors can however be tolerated, as has been shown by investigations, since it remains considerably below the number of smudge symbols usually given.

The cooperation between the various circuits of the described embodiment illustrated in Figs. 1 to 4 is shown in Fig. 8.

A further embodiment will now be explained with reference to Figs. 5 to 7. In this embodiment it is assumed that a ten-element code is to be used derived from the original five-element code by repeating the signal in the same polarity or with mirror-symmetrical polarity depending upon the composition of the symbol in the five-element code. The advantage of this ten-element code is that singly disturbed symbols can be automatically corrected by the code testing device, while multiply disturbed symbols are for the major part recognized as being disturbed.

The arrangement according to the invention makes it now possible to correct also the signals, which have been determined to be multiply disturbed, by a reversal of the polarity of the uncertain elements received. An aimed reversal of polarity such as explained in connection with the first embodiment, can be effected only with relative difficulty. It is therefore advantageous to effect in this case a successive reversal of polarity of the uncertain elements in accordance with a rigid program, as will be presently explained. For the theory, let us first of all assume that the symbol recognized to be disturbed contains a total of $k$ uncertain elements. For supervising or checking there would then enter into consideration in this case $2k$ different elements from which the defective signal may have arisen. The polarity-reversal device has in this connection the object of producing these $2k$ elements, or a given part thereof, one after the other, and the code testing device must in each case determine whether the elements formed in this manner comply with the code conditions. Upon reception of an uncertain element, the armature of the receiving relay and thus also that of the corresponding storage relay are as a rule on the side which has the greatest probability. The polarity reversal device should therefore not simultaneously reverse the polarity of all uncertain elements but rather one after the other, at first in each case, only one element and thereupon in each case two elements, and finally a plurality of elements simultaneously.

As soon as the code testing device has detected a correct symbol or a symbol which is correctible by the code testing device itself, the polarity-reversal device must be stopped and the symbol evaluated. If on the other hand during the course of the reversals of polarity, no utilizable symbol at all is ascertained, a smudge signal or, if desired, a call-back signal, must be transmitted. Figs. 5 to 7 show an example of a suitable circuit for this purpose.

In accordance with Fig. 5, the distributor contacts **2*k*1 to 2*k*10 determine the position of the armature 2*er* of a receiving relay and set the polarized relays 2R1 to 2R10 corresponding to the symbol elements received. In order to obtain sufficient time for the evaluation and error correction, after the scanning of the last element, the setting of the relays 2R1 to 2R10 is taken over, by actuation of the distributor contacts 2*k*11 and 2*k*12, by the storage relays 2R11 to 2R20 and from here with a slight delay by the storage relays 2R21 to 2R30**. This series connection of two groups of storage relays facilitates the time condition for the reversal of polarity, as will be further explained below.

The uncertain elements indicated by a relay are stored simultaneously, as the elements themselves, by way of the contact **2*dr* in the relays 2D1 to 2D10 and thereupon taken over by the storage relays 2D11 to 2D20 by actuation of the distributor contact 2*k*13**.

Fig. 6 shows for this arrangement a known code-testing device, wherein, depending on the position of contacts of the storage relays 2R21 to 2R30, a relay bank comprising relays 2T1 to 2T5 and 2Y1 to 2Y5 and, as a function thereof, storage relays 2X1 to 2X5 are actuated. Furthermore, Fig. 6 shows within the code-testing device a bridge circuit operating as an evaluation device, comprising a bridge relay 2V1 which, in order to gain time for the evaluation, is a polarized relay and cooperates with a neutral sequence relay 2V2 within the polarity reversal device shown in Fig. 7. The manner of operation of the code testing device shown is known per se. In the case of undisturbed signals and in case of signals with only one wrong element, the polarity-reversal device, of Fig. 7, remains disconnected since the contact **2*u* or the contact 2*v*1** is open.

If on the other hand a multiply disturbed non-evaluatable symbol is detected by the code-testing device, the armatures **2*u* and 2*v*1 (Fig. 7) are in actuated alternate position and apply voltage to the program contacts 2*k*15, 2*k*16 and 2*k*17. If no uncertain elements have been received, then none of the relays 2D11 to 2D20 (Fig. 5) has been energized and the corresponding contacts are all in normal position and the polarity-reversal device remains ineffective. If, however, for instance, the fourth element is found to be uncertain, relay 2D14 connects the program contact 2*k*15 by way of contact 2*d*III14 to the polarity-reversal winding 2R'14 of the storage relay 2R14. If in another case for instance the elements 2, 5 and 9 are uncertain, then the armatures 2*d*I12, 2*d*II12, 2*d*III12, 2*d*I15, 2*d*II15, 2*d*III15, 2*d*II19, and 2*d*III19 are reversed and the three program contacts 2*k*15, 2*k*16 and 2*k*17 are connected with the polarity reversal windings 2R'12 and 2R'15 and 2R'19**, respectively. In the case of more than three uncertain elements, in each case only the first three are detected and the others remain unchanged.

The contacts **2*k*15, 2*k*16, 2*k*17** are in each case briefly actuated in accordance with a given program. Upon each contact closure, the connected storage relay has its polarity reversed over its polarity reversal winding in the following manner:

By the sequence storage relay 2R21 cooperating with the storage relay 2R11, there is in each case placed in action the winding half of 2R'11 which upon the energizing of relay 2R11 reverses polarity with respect to its instantaneous position. This is effected over contacts **2*r*21 to 2*r*30 (Fig. 7). The relay 2R21 (Fig. 5) is thereupon actuated with such a delay that it shifts to the other winding half of winding 2R'11 only after the termination of the polarity-reversal current pulse. Upon the next polarity-reversal current pulse, the relays 2R11 and 2R21** are again restored to normal.

With the three program contacts **2*k*15 to 2*k*17 shown in Fig. 7 up to eight different polarities of uncertain elements can be successively examined. The code testing device operates continuously at the same time and checks the result after each reversal of polarity. As soon as a correct or correctible symbol is produced, the polarity-reversal device is disconnected over the contacts 2*v*1 or 2*u*** (Fig. 7) so that the last setting of the storage relays remains.

After completion of the reversal of polarity the relays 2T1 to 2T5 (Fig. 6) transmit the final state of the storage relays 2R21 to 2R25 and thus the received symbol with corrected elements. If a singly wrong element should still be present, it is corrected by the relays 2X1 to 2X5 (Fig. 6) together with the relay 2V2 (Fig. 7) of the code-testing device. By actuation of contact **2*k*14, Fig. 7, further transmission is effected over relays 2N1 to 2N5. The distributor contacts 2*s*1 to 2*s*6 (Fig. 7) transmit the corresponding teleprinter symbol, contacts 2*s*1 to 2*s*5 extending the group of elements and the contact 2*s*6** extending the stop element.

In case of an interval signal, relay 2P (Fig. 7) remains deenergized since all five relays 2N1 to 2N5 give negative elements. The armature **2*p* of relay P thereupon together with contact 2*s*6** extends continuous spacing current to the transmission line.

If in spite of the reversal of polarity of the uncertain elements no evaluatable signal is produced, relay 2Q1 (Fig. 7) is energized and, over 2K14, also relay 2Q2. The contact **2*q*2 disconnects the transmitter contacts 2*s*1, 2*s*2, 2*s*4 and 2*s*5 and applies voltage to 2*s*3. As a result, the signal is transmitted which, within the five-element teleprinter code, represents the signal for a spacing. Of course there can also be effected by relay 2Q2** the transmission of another smudge signal or an automatic call-back. The cooperation between the various circuits of the described embodiment illustrated in Figs. 5 to 7 is shown in Fig. 9.

The arrangement in accordance with the invention has been described for two particular error-indicating teleprinter codes. It can of course be used for the most varied other error-indicating or correcting codes and thus for instance for a nine-element code which in addition to the five elements of the teleprinter symbol also transmits four security elements. In each case there need merely be effected, as a function of an element testing, a reversal of the polarity of the elements of the signal which have been recognized as being of uncertain accuracy.

For the carrying out of the invention there are furthermore not absolutely required receiving devices which operate with cam contacts and relays as described, among others, for reasons of easier comprehension. The invention may of course also be employed to advantage in the case of receiving distributors which are equipped with counting chains and electronic switching members.

Changes may be made within the scope and spirit of the appended claims.

I claim:

1. A system for detecting and correcting errors in telegraphic communications in which message symbols are transmitted in accordance with a dual-current system as groups of signal elements of an error-indicating code adapted to recognize multiply disturbed signal elements, comprising a code testing device for evaluating the signal elements of the transmitted code, an element testing device, and means for utilizing the findings of said element testing device for the correction of symbols recognized to be disturbed by said code testing device.

2. A system according to claim 1, wherein said code testing device comprises means for correcting symbols containing a definitely limited number of disturbed signal elements, and means in said element testing device for correcting only symbols which are non-correctible by said code testing device.

3. A system according to claim 1, comprising means in said element testing device for differentiating between accurately transmitted signal elements and signal elements of uncertain accuracy, and means for reversing the polarity of signal elements of a disturbed symbol which are of uncertain accuracy so as to correct such symbol.

4. A system according to claim 1, comprising means for signalling non-correctible symbols.

5. A system according to claim 1, comprising a group of receiving members, means for respectively setting said receiving members in accordance with the probable polarity of corresponding received signal elements, and a group of polarity-indicating storage members for respectively determining with great probability the relative accuracy or uncertainty of received signal elements.

6. A system according to claim 5, comprising switching means respectively associated with said receiving members and said polarity-indicating members, and means for transferring to said switching means the values ascertained upon reception for the purpose of effecting supervision and correction of errors.

7. A system according to claim 1, comprising an error evaluating device, supervisory relay means in said evaluating device, a polarity-reversal device for correcting signal elements, and means controlled by said evaluating device for preparing the operation of said polarity-reversal device depending upon whether a received symbol contains respectively too many or too few signal elements of a given polarity, whereby only signal elements of the type received in excess are changed in their polarity to effect correction of the corresponding symbol.

8. A system according to claim 3, comprising means for reversing the polarity of signal elements in predetermined manner depending upon the operation of said element testing device.

9. A system according to claim 8, comprising means in said code testing device for ascertaining after each polarity reversal whether the symbol produced is respectively correct or correctible, and means for thereafter inhibiting polarity-reversal.

References Cited in the file of this patent

UNITED STATES PATENTS

| | | |
|---|---|---|
| 2,235,755 | Bakker et al. | Mar. 18, 1941 |
| 2,552,629 | Hamming et al. | May 15, 1951 |
| 2,628,346 | Brukhart | Feb. 10, 1953 |
| 2,640,872 | Hartley et al. | June 2, 1953 |
| 2,653,996 | Wright | Sept. 29, 1953 |
| 2,706,215 | Van Duuren | Apr. 12, 1955 |